United States Patent [19]
Golden et al.

[11] Patent Number: 6,038,272
[45] Date of Patent: Mar. 14, 2000

[54] JOINT TIMING, FREQUENCY AND WEIGHT ACQUISITION FOR AN ADAPTIVE ARRAY

[75] Inventors: Glenn David Golden, Tinton Falls; Jack Harriman Winters, Middletown, both of N.J.

[73] Assignee: Lucent Technologies Inc., Murray Hill, N.J.

[21] Appl. No.: 08/716,659

[22] Filed: Sep. 6, 1996

[51] Int. Cl.$^7$ .............................. H04B 7/08; H04L 1/02
[52] U.S. Cl. .................. 375/347; 375/349; 375/362; 455/561; 455/273; 455/275
[58] Field of Search .................................. 375/347, 260, 375/267, 349, 362; 455/517, 561, 562, 137, 269, 273, 275; 370/347

[56] References Cited

U.S. PATENT DOCUMENTS

| | | | |
|---|---|---|---|
| 4,717,919 | 1/1988 | Cherrette et al. | 342/383 |
| 5,481,570 | 1/1996 | Winters | 375/347 |
| 5,499,272 | 3/1996 | Bottomley | 375/347 |

OTHER PUBLICATIONS

Winters, J., Signal Acquisitions and Tracking with Adaptive Arrays in the Digital Mobile Radio System IS–54 with Flat Fading; published in IEEE Transactions on Vehicular Technology, vol. 42, No. 4, Nov., 1993, pp. 377–384.

Winters, J., et al The Impact of Antenna Diversity on the Capacity of Wireless Communicatiuons Systems, published in IEEE Transactions on Communications, vol. 42, No. 2/3/4, Feb., Mar., Apr. 1994 pp. 1740–1751.

*Primary Examiner*—Amanda T. Le

[57] ABSTRACT

An apparatus for performance improvement of a digital wireless receiver comprises a processing circuit for processing a plurality of received signals and providing a processed signal where the received signals are multiplied by weights and combined; and a weight generation circuit for generating the weights; wherein the received signals are sampled at a multiple of a symbol rate, different weights for each set of samples at a symbol rate are generated and the weights are selected to optimize performance.

19 Claims, 4 Drawing Sheets

JOINT TIMING, FREQUENCY AND WEIGHT ACQUISITION FOR AN ADAPTIVE ARRAY

CROSS REFERENCES TO RELATED APPLICATIONS

This application is related to copending U.S. patent application Ser. No. 08/606,777, entitled "Introducing Processing Delays As A Multiple Of The Time Slot Duration" filed on Feb. 27, 1996, U.S. Pat. No. 5,887,037, and copending U.S. patent application Ser. No. 08/695,492, entitled "Output Signal Modification For Soft Decision Decoding" filed on Aug. 12, 1996, 1996.

FIELD OF THE INVENTION

The present invention relates to the field of wireless communication and more particularly to digital wireless communication systems.

BACKGROUND OF THE INVENTION

In wireless communication systems, the use of antenna arrays at the base station has been shown to increase both range, through increased gain, and capacity, through interference suppression. With adaptive antenna arrays, the signals received by multiple antenna elements are weighted and combined to improve system performance, e.g., by maximizing the desired receive signal power and/or suppressing interference. The performance of an adaptive antenna array increases dramatically with the number of antennas. Referring to an article entitled, "The Impact of Antenna Diversity on the Capacity of Wireless Communication Systems," by J. H. Winters, R. D. Gitlin and J. Salz, in IEEE Trans. on Communications, April 1994, it is shown that using an M element antenna array with optimum combining of the received signals can eliminate $N \leq M-1$ interferers and achieve an M-N fold diversity gain against multipath fading, resulting in increased range.

Most base stations today, however, utilize only two receive antennas with suboptimum processing, e.g., selection diversity where the antenna having the larger signal power is selected for reception and processing. It is desirable to be able to modify existing base stations to accommodate larger arrays of antennas and/or improved received signal combining techniques. However, modifying existing equipment is difficult, time consuming, and costly, in particular since equipment currently in the field is from a variety of vendors.

One alternative is to utilize an applique, which is an outboard signal processing box, interposed between the current base antennas and the input to the base station, which adaptively weights and combines the received signals fed to the base station, optionally utilizing additional antennas. FIG. 1 shows a base station utilizing an applique. A key to the viability of utilizing the applique approach is that it should require little, if any, modification of the base station equipment. This constraint implies that the processing performed by the applique must be transparent to the existing equipment. Ideally, the signal emerging from the applique should appear to the existing base station as a high-quality received signal from a single antenna.

A difficulty in obtaining transparency to the existing equipment is in the weight calculation. With the correct symbol timing and carrier frequency, the weights can be generated to combine the signals received from multiple antennas to increase gain and suppress interference, permitting operation even with noise and/or interference power that is greater than the signal power. However, before the adaptive array combining, the desired signal may be masked by noise and interference. When the desired signal is so masked, traditional symbol timing and carrier frequency recovery methods will not work.

A previously proposed solution is scanning a narrow beam antenna coupled with utilizing traditional symbol timing and carrier frequency recovery methods as the beam is scanned. However, this approach will not work when the interference is in the same narrow beam as the desired signal and in severe multipath environments.

Therefore, there is a need to calculate the weights for combining the received signals which will function in severe multipath and interference environments.

SUMMARY OF THE INVENTION

In accordance with the present invention, there is provided an apparatus for performance improvement of a digital wireless receiver. The apparatus comprises a processing circuit for processing a plurality of received signals and providing a processed signal where the received signals are weighted and combined; and a weight generation circuit for generating the weights; wherein the received signals are sampled at a multiple of a symbol rate, different weights for each set of samples at a sample rate are generated and the weights are selected to optimize performance.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Although the present invention is particularly well suited for use in TDMA mobile radio systems and shall be described with respect to this application, the methods and apparatus disclosed here can be applied to other digital wireless communication systems. Although the present invention is particularly well suited for use with an applique and shall be described with respect to this application, the methods and apparatus disclosed here can be is equally well suited for an integrated solution for adaptive arrays in a base station.

In TDMA mobile radio systems, such as North American Digital Mobile Radio Standard IS-136, in the uplink from mobile station to base station, data is transmitted periodically in time slots or bursts of a known and fixed duration. Each data burst is processed, essentially independently of other data bursts, by the base station receiver. Thus, it is possible to design the applique so that it introduces artificial delay in excess of its true signal processing delay, so that the total delay through the applique is nominally a multiple of the time slot duration. With this arrangement, the delayed data burst arrives nominally aligned with a later time slot, rather than simply very late for its own time slot.

Since all uplink data bursts are processed by the applique in this way, all uplink bursts are time shifted into later time slots, and thus the net delay of all uplink data is increased by the applique delay. Uplink data bursts typically comprise both voice traffic and various administrative information utilized by the cellular system. Thus, additional considerations with this approach are that the additional voice delay be tolerable to the user, and that the additional delays in the administrative data be tolerable to the cellular system as a whole. Illustratively, for the IS-136 traffic channel, operating with full-rate voice coders, the time from the beginning of the time slot of one user to the beginning of that user's next time slot is 20 milliseconds (ms). This delay is adequate for the necessary signal processing, but is unobtrusive to system users. The IS-136 specifications for administrative data transferred via the traffic channel allow for up to 100 ms response times, so that although the 20 ms of applique delay reduces the delay available, it does not exceed the specification. Thus, this technique is viable for the traffic channel in IS-136, and for other burst-mode wireless communication systems as well. In a Groupe Speciale Mobile (GSM) based system, also known as Global System for Mobile Communications, which is a standard digital cellular phone service used in Europe and Japan, the delay would correspond to a multiple of 4.615 ms. In a Digital European Cordless Telecommunications (DECT) based system, which is a pan-European digital cordless telephony interface specification, the delay would correspond to a multiple of 10 ms.

Figure 1:
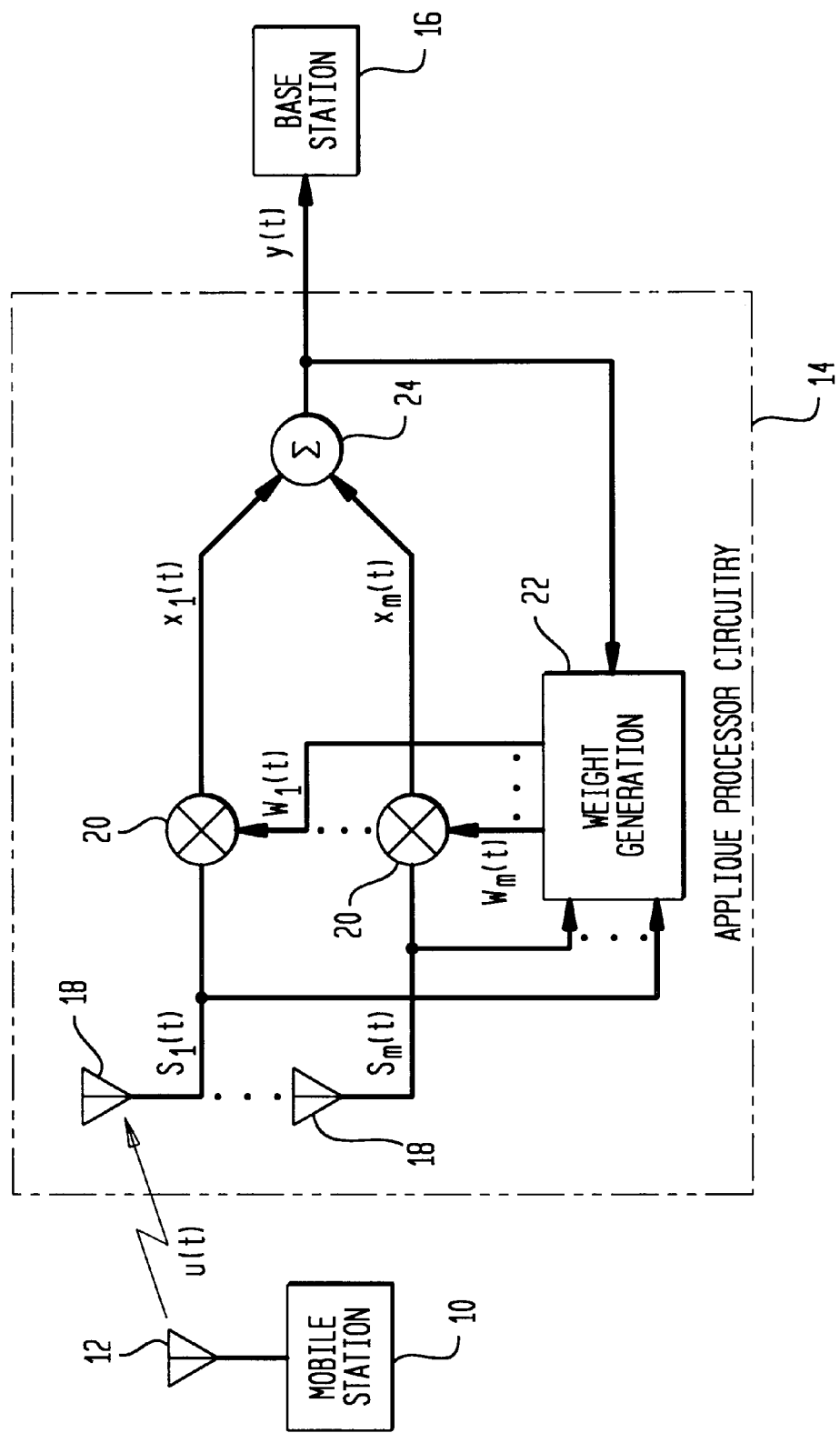
FIG. 1 is a block diagram of an adaptive array using multiple antennas.

Referring to FIG. 1 there is shown a block diagram of a type of signal processing used in a base station applique. A signal u(t) transmitted by a mobile station 10 through a mobile antenna 12 is received by a base station 16 from M antennas 18, with received signals $s_1(t)$ to $s_m(t)$, respectively. The received signals are weighted using multipliers 20 having weights $w_1(t)$ to $w_m(t)$, respectively, to generate corresponding weighted signals $x_1(t)$ to $x_m(t)$. The weighted signals $x_1(t)$ to $x_M(t)$ are then combined using summer 24 to generate an output signal y(t) which is then provided to the base station equipment. Weights $w_1(t)$ to $w_m(t)$ are generated by weight generation circuitry 22 using the received signals $s_1(t)$ to $s_m(t)$ and output signal y(t). At the applique processor circuitry 14, received signals $s_1(t)$ to $s_m(t)$ are weighted and combined to improve signal quality at the output.

With the correct symbol timing and carrier frequency, the weights can be generated to combine the signals received from multiple antennas to increase gain and suppress interference, permitting operation even with noise and/or interference power that is greater than the signal power. However, before the adaptive array combining, the desired signal may be masked by noise and interference. When the desired signal is so masked, traditional symbol timing and carrier frequency recovery methods will not work.

In accordance with the present invention, the received signal is sampled at an integer multiple of the symbol rate, the samples obtained over the duration of an entire time slot are stored, and then the best set of symbol-spaced samples from the entirety of the time slot is chosen.

In order to better understand the invention, an illustrative embodiment using the IS-136 system will be considered. Each IS-136 time slot consists of one hundred sixty two symbols, including a fourteen symbol synchronization sequence which is known a priori at the receiver. In this illustrative embodiment, the receiver samples each time slot at the rate of N/T samples/second, where T is the transmitted symbol interval. Thus, a total of 162•N samples are taken of the time slot signal. These samples are denoted $s_0, s_1, \ldots, s_{162 \cdot N-1}$. This sequence of samples consists of N epochs, $E_0, \ldots, E_{N-1}$, where each epoch consists in turn of a set of symbol-spaced samples, i.e. $E_0=\{s_0, s_N, s_{2N}, \ldots\}$, $E_1=\{s_1, s_{N+1}, s_{2N+1}, \ldots\}$ and so on.

In accordance with the present invention, a set of weights (sync weights) is generated over the known synchronization sequence for each timing epoch, and for several possible 'trial' values of carrier frequency offset as well, if needed. In one embodiment of the invention, NM sets of sync weights are generated, where M is the number of carrier frequency offset trial values. Thus, there are NM combinations of timing epoch and carrier frequency offset. The best timing epoch and carrier frequency offset combination is chosen to be that one for which the sync weights yield the smallest value of mean squared error in the array output signal over the synchronization sequence.

To more clearly understand the illustrative embodiment of the present invention an example should be considered. In this case, with just one value of carrier frequency offset and four timing epochs (M=1, N=4), one of the four timing epochs will be within ⅛ symbol of the optimum sampling time, which will most probably result in the smallest mean squared error. This timing epoch is then selected and used to process the remainder of the data in the time slot.

When it is desired to have accuracy greater than ≅⅛ symbol, digital interpolation of the received signal samples can be utilized to derive more closely spaced samples. The digital interpolation can be incorporated into the digital receive filters. In another embodiment, the best timing that is available can be used with the incoming received signal samples, then standard techniques would be utilized on the weighted/combined output to determine a more accurate timing value. This is implemented by interpolating the weighted/combined output samples, which thus reduces the number of interpolating filters that are required.

Figure 2:
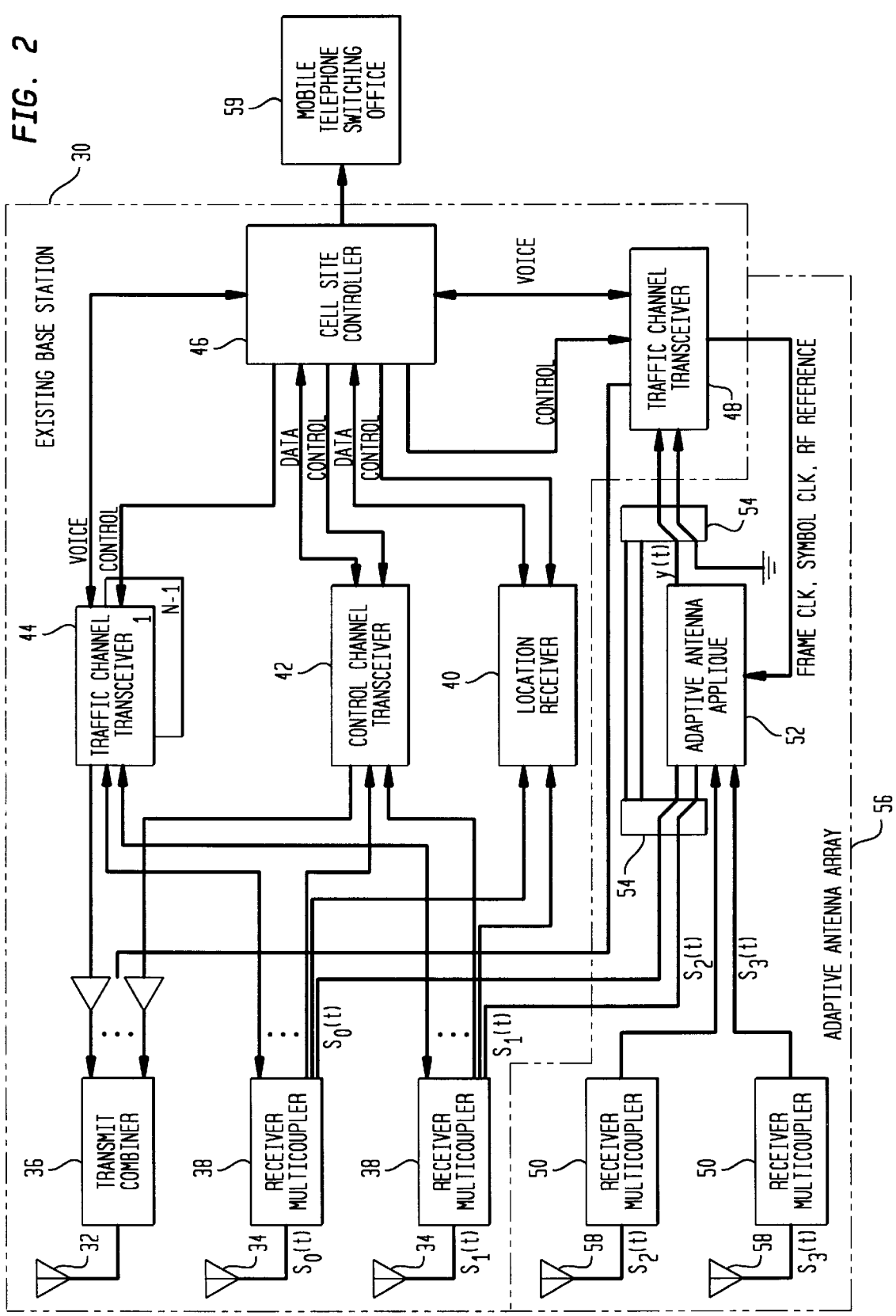
FIG. 2 is a block diagram of a current base station with applique.

Referring to FIG. 2 there is shown an existing base station with an adaptive antenna applique. An existing base station 30 consists of one transmit antenna 32 and two receive antennas 34. Signals received by the receive antennas 34 are coupled to a corresponding receiver multicoupler 38, which splits received signals $s_0(t)$ and $s_1(t)$ to a location receiver 40, control channel transceiver 42, N-1 traffic channel transceivers 44, and traffic channel transceiver 48, one transceiver per traffic channel. For each traffic channel, traffic channel transceiver 44 uses received signals $s_0(t)$ and $s_1(t)$ from receive antennas 34 to generate an output voice signal. The voice signals out of the traffic channel transceiver 44 are fed to cell site controller 46 and then passed to mobile telephone switching office MTSO 59.

To add processing such as that shown in FIG. 1, an antenna applique can be added to the base station, with an exemplary embodiment as shown in FIG. 2, illustratively for improving the performance of traffic channel transceiver 48. The added circuitry 56 has two additional receive antennas 58. Signals received by the additional receive antennas 58 are coupled to corresponding receiver multicouplers 50 as in current base station 30. Signals from the receive antennas $s_0(t)$ to $s_3(t)$ are then processed by adaptive antenna applique 52, which generates output signal y(t) that is fed to traffic channel transceiver 48. In FIG. 2, switches 54 permit an input signal of the traffic channel transceiver 48 to be switched between the existing base station 30 and the adaptive antenna applique 52. In this embodiment the addition of the adaptive applique 52 requires no modification of the existing base station 30.

Figure 3:
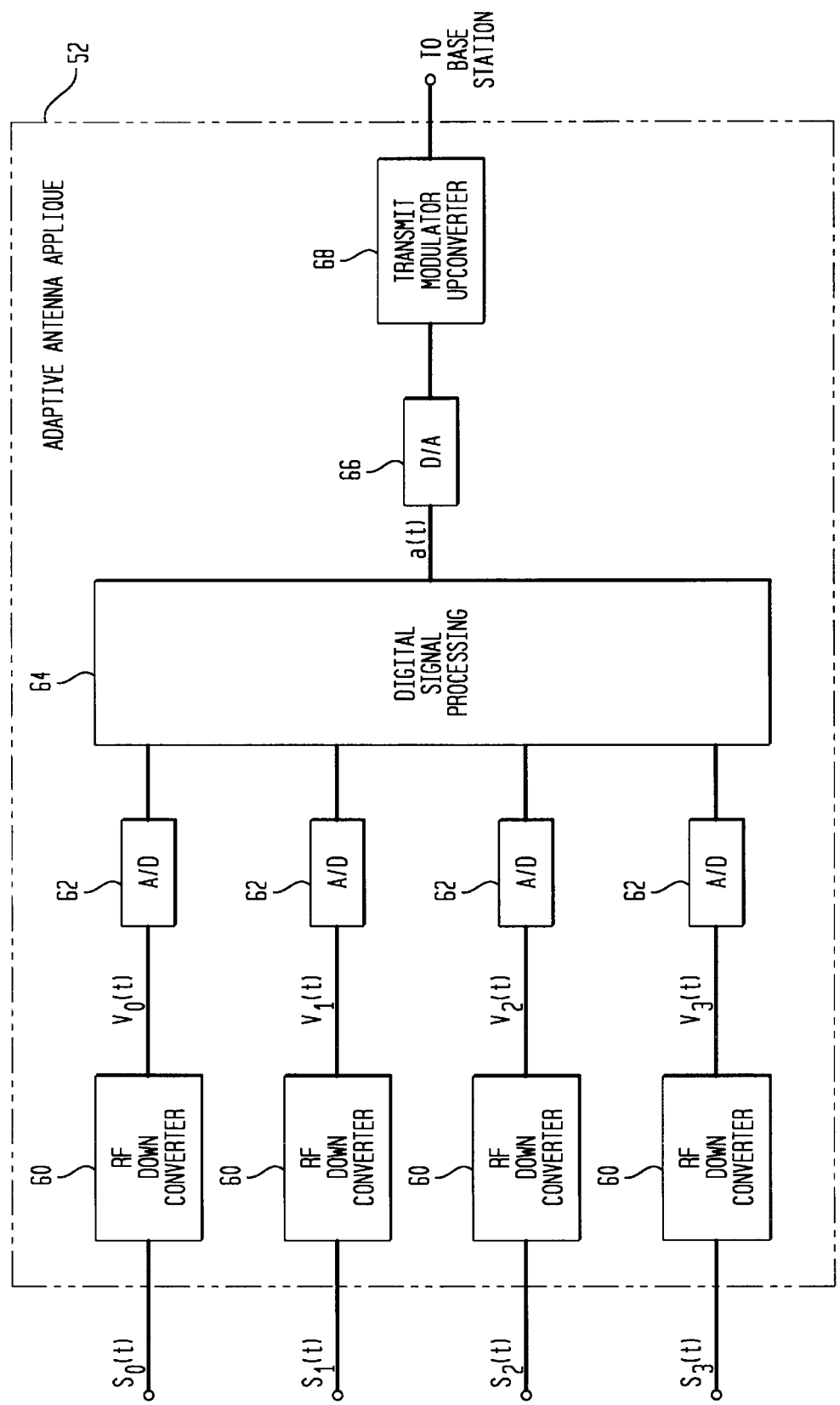
FIG. 3 shows a detailed block diagram of the applique.

Referring to FIG. 3 there is shown further detail of the adaptive antenna applique 52 of FIG. 2. Received signals $s_0(t)$ to $s_3(t)$ from multicouplers 38 and 50 in FIG. 2 are converted from RF to baseband, or to IF, by RF downconverters 60. Output signals $v_0(t)$ to $v_3(t)$ from downconverters 60 are then converted to digital samples by A/D converters 62, and the digital samples are processed by digital signal processing circuitry 64. The digital signal processing circuitry 64 generates an output signal a(t) which is converted to an analog signal by D/A converter 66 and upconverted to the received carrier frequency by Transmit Modulator/Upconverter circuitry 68, and the output signal is then coupled to base station traffic channel transceiver 48 in FIG. 2. The applique processes received signals $s_0(t)$ to $s_3(t)$ so as to generate an output signal which appears to the base station 30 in FIG. 2 to have come from a standard antenna, i.e., the applique processing is transparent to the base station 30.

Figure 4A:
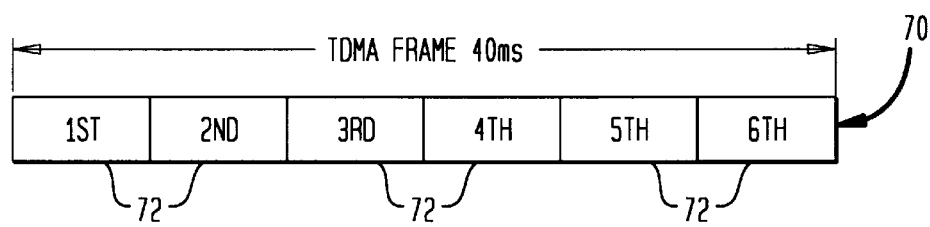
FIGS. 4A and 4B show the frame and time slot architecture of the uplink digital traffic channel used in IS-136.
Figure 4B:
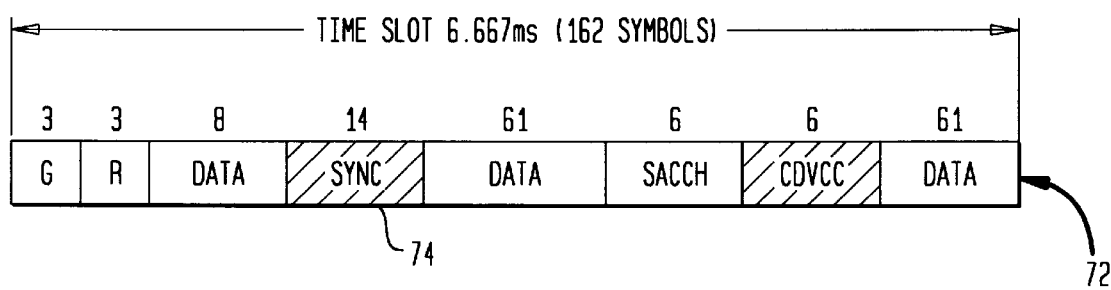

Referring to FIG. 4A there is shown the TDMA frame 70 and time slots 72. Referring to FIG. 4B there is shown in detail a time slot structure 72 of IS-136 uplink (mobile station to base station) digital traffic channel. This is a time-division multiple access (TDMA) frame structure, wherein data transmitted from each mobile station (cellular phone) user is transmitted periodically in time slots 72 or "bursts". There are 6 time slots 72 defined per frame 70. The duration of frame 70 is 40 ms, and each of time slots 72 is one-sixth of the frame duration, approximately 6.7 ms. Each time slot 72 comprises 162 symbols, including synchronization (SYNC) sequence 74. The SYNC 74 comprising symbols 15 through 28. This synchronization sequence is fixed and known a priori at the receiver.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed is:

1. An apparatus for performance improvement of a digital wireless receiver comprising:

a processing circuit for processing a plurality of received signals and providing a processed signal, wherein said received signals are weighted by weights and combined; and a weight generation circuit for generating said weights;

wherein said received signals are sampled at a multiple of a symbol rate, different weights are generated for each set of samples at said symbol rate and for different carrier frequency offsets, said weights ate selected to optimize performance of the digital wireless receiver.

2. The apparatus as recited in claim 1 wherein said sample rate is four times said symbol rate.

3. The apparatus as recited in claim 1 wherein said processing circuit reduces a mean squared error of an output signal.

4. The apparatus as recited in claim 3 wherein said processing circuit minimizes said mean squared error of said output signal.

5. The apparatus as recited in claim 1 wherein said plurality of received signals comprise TDMA mobile radio signals.

6. The apparatus as recited in claim 5 wherein said TDMA mobile radio signals comprise IS-54 based mobile radio signals.

7. The apparatus as recited in claim 5 wherein said TDMA mobile radio signals comprise IS-136 based mobile radio signals.

8. The apparatus as recited in claim 5 wherein said TDMA mobile radio signals comprise GSM mobile radio signals.

9. The apparatus as recited in claim 5 wherein said TDMA mobile radio signals comprise DECT mobile radio signals.

10. The apparatus as recited in claim 1 wherein said processing circuit comprises a digital signal processor.

11. The apparatus as recited in claim 1 wherein said weight generation circuit comprises a digital signal processor.

12. The apparatus as recited in claim 1 wherein said processing circuit weights and combines said received signals using a predetermined symbol pattern within a time slot.

13. The apparatus as recited in claim 1 wherein said processing circuit weights and combines said received signals using a predetermined symbol pattern comprising a sync sequence within a time slot.

14. A method for performance improvement of a digital wireless receiver comprising the steps of:

processing a plurality of received signals;

sampling said received signals at a multiple of a symbol rate;

determining different weights for each set of samples;

selecting said different weights for a set of samples wherein performance of the digital wireless receiver is optimized and said different weights are generated for different frequency offsets.

15. The method as recited in claim 14 wherein the step of sampling comprises sampling at a sample rate four times said symbol rate.

16. The method as recited in claim 14 wherein the step of processing a plurality of received signals further comprises reducing a mean squared error of an output signal.

17. The method as recited in claim 16 wherein the step of processing a plurality of received signals further comprises minimizing said mean squared error of said output signal.

18. The method as recited in claim 14 wherein the step of processing a plurality of received signals further comprises using a predetermined symbol pattern within a time slot.

19. The method as recited in claim 14 wherein the step of processing a plurality of received signals further comprises using a predetermined symbol pattern within a sync sequence within a time slot.

* * * * *